United States Patent
Kim

(10) Patent No.: US 9,689,191 B1
(45) Date of Patent: Jun. 27, 2017

(54) POWER TAILGATE CONTROL DEVICE AND METHOD

(71) Applicant: Hyundai Motor Company, Seoul (KR)

(72) Inventor: Cheol Han Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/152,683

(22) Filed: May 12, 2016

(30) Foreign Application Priority Data

Oct. 8, 2015 (KR) .................. 10-2015-0141406

(51) Int. Cl.
| | | |
|---|---|---|
| *B60Q 1/00* | (2006.01) | |
| *G08G 1/16* | (2006.01) | |
| *E05F 15/70* | (2015.01) | |
| *B62D 33/027* | (2006.01) | |
| *B60J 5/10* | (2006.01) | |
| *H04N 7/18* | (2006.01) | |
| *G06K 9/00* | (2006.01) | |

(52) U.S. Cl.
CPC .............. *E05F 15/70* (2015.01); *B60J 5/108* (2013.01); *B62D 33/0273* (2013.01); *G06K 9/00805* (2013.01); *H04N 7/183* (2013.01); *E05Y 2400/32* (2013.01); *E05Y 2400/322* (2013.01); *E05Y 2900/546* (2013.01)

(58) Field of Classification Search
None
See application file for complete search history.

(56) References Cited

U.S. PATENT DOCUMENTS

| | | | | |
|---|---|---|---|---|
| 4,833,469 A | * | 5/1989 | David ................ | B60K 31/0008 180/169 |
| 6,285,778 B1 | * | 9/2001 | Nakajima ............ | G05D 1/0248 180/167 |
| 7,528,703 B2 | * | 5/2009 | Touge ...................... | B60Q 9/00 340/425.5 |
| 8,254,632 B2 | * | 8/2012 | Heinrich ................ | B60Q 1/143 340/937 |
| 9,068,390 B2 | | 6/2015 | Ihlenburg et al. | |
| 9,171,217 B2 | * | 10/2015 | Pawlicki ............ | B60K 31/0008 |

(Continued)

FOREIGN PATENT DOCUMENTS

| | | |
|---|---|---|
| JP | 2009-299387 A | 12/2009 |
| JP | 2015-017495 A | 1/2015 |

(Continued)

*Primary Examiner* — John R Olszewski
*Assistant Examiner* — Navid Ziaeianmehdizadeh
(74) *Attorney, Agent, or Firm* — Mintz Levin Cohn Ferris Glovsky and Popeo, P.C.; Peter F. Corless

(57) ABSTRACT

A power tailgate control device and method can prevent a collision with an obstacle during the opening or closing of a tailgate by determining whether an obstacle is present or not and whether the collision with the obstacle would occur or not by using a rear lamp and a rear camera. The power tailgate control device includes: a command input unit receiving a tailgate open or close command from an operator; a rear camera mounted on a tailgate; and a controller controlling the opening or closing of the tailgate by determining whether a collision with an obstacle would occur or not, on the basis of R values of pixels in a difference image between a first image captured in a state in which a rear lamp is turned on and a second image captured in a state in which the rear lamp is turned off.

12 Claims, 5 Drawing Sheets

(56) References Cited

U.S. PATENT DOCUMENTS

| | | | |
|---|---|---|---|
| 9,436,880 B2 * | 9/2016 | Bos | B60N 2/002 |
| 2001/0042989 A1 * | 11/2001 | Greif | B60J 5/101 |
| | | | 296/50 |
| 2002/0074959 A1 * | 6/2002 | Van Wiemeersch | G07C 9/00182 |
| | | | 318/445 |
| 2002/0084675 A1 * | 7/2002 | Buchanan, Jr. | B60J 5/101 |
| | | | 296/146.8 |
| 2003/0052969 A1 * | 3/2003 | Satoh | B60R 1/00 |
| | | | 348/148 |
| 2004/0200149 A1 * | 10/2004 | Dickmann | G01S 7/4817 |
| | | | 49/26 |
| 2005/0085972 A1 * | 4/2005 | Martinez | E05C 17/00 |
| | | | 701/49 |
| 2005/0174077 A1 * | 8/2005 | Haag | G01S 13/04 |
| | | | 318/280 |
| 2008/0294314 A1 * | 11/2008 | Morris | E05F 5/00 |
| | | | 701/49 |
| 2009/0000196 A1 * | 1/2009 | Kollar | E05F 15/43 |
| | | | 49/28 |
| 2009/0309710 A1 * | 12/2009 | Kakinami | B60Q 9/004 |
| | | | 340/435 |
| 2010/0076651 A1 * | 3/2010 | Nakakura | E05C 17/00 |
| | | | 701/49 |
| 2011/0043633 A1 * | 2/2011 | Sarioglu | G01S 5/16 |
| | | | 348/148 |
| 2011/0196568 A1 * | 8/2011 | Nickolaou | B60W 30/0953 |
| | | | 701/31.4 |
| 2011/0215916 A1 * | 9/2011 | Boehme | E05F 15/43 |
| | | | 340/436 |
| 2013/0055639 A1 | 3/2013 | Brosseit | |
| 2014/0168415 A1 * | 6/2014 | Ihlenburg | B60R 11/04 |
| | | | 348/118 |
| 2014/0207344 A1 * | 7/2014 | Ihlenburg | E05F 15/74 |
| | | | 701/49 |
| 2014/0218529 A1 * | 8/2014 | Mahmoud | H04N 7/181 |
| | | | 348/148 |
| 2014/0379218 A1 * | 12/2014 | Foltin | G06T 7/0042 |
| | | | 701/41 |
| 2015/0300073 A1 | 10/2015 | Ihlenburg et al. | |

FOREIGN PATENT DOCUMENTS

| | | |
|---|---|---|
| KR | 10-0579282 B1 | 5/2006 |
| KR | 10-0818317 | 3/2008 |
| KR | 10-0837389 | 6/2008 |

* cited by examiner

|    |    |    |    |    |
|----|----|----|----|----|
| 12 | 13 | 11 | 10 | 8  |
| 11 | 10 | 12 | 11 | 10 |
| 10 | 11 | 13 | 12 | 11 |
| 8  | 14 | 10 | 10 | 8  |

| 25 | 28 | 13 | 10 | 8 |
|----|----|----|----|----|
| 22 | 20 | 16 | 11 | 10 |
| 12 | 15 | 14 | 12 | 11 |
| 8  | 14 | 10 | 10 | 8 |

R1

−

| 12 | 13 | 11 | 10 | 8 |
|----|----|----|----|----|
| 11 | 10 | 12 | 11 | 10 |
| 10 | 11 | 13 | 12 | 11 |
| 8  | 14 | 10 | 10 | 8 |

R2

=

| 13 | 15 | 2 | 0 | 0 |
|----|----|---|---|---|
| 11 | 10 | 4 | 0 | 0 |
| 2  | 4  | 1 | 0 | 0 |
| 0  | 0  | 0 | 0 | 0 |

POWER TAILGATE CONTROL DEVICE AND METHOD

CROSS-REFERENCE TO RELATED APPLICATION

This application claims under 35 U.S.C. §119(a) the benefit of Korean Patent Application No. 10-2015-0141406, filed on Oct. 8, 2015 in the Korean Intellectual Property Office, the entire contents of which are incorporated by reference herein.

BACKGROUND (a) Technical Field

The present invention relates to a power tailgate control device and method and, more particularly, to a power tailgate control device and method for opening or closing a power tailgate, while avoiding a collision with an obstacle, without a distance measurement sensor.

(b) Description of the Related Art

Multi-purpose vehicles (MPVs) including a recreational vehicle (RV), a sport utility vehicle (SUV), a car derived van (CDV) and the like have a relatively large tailgate compared to a passenger car.

In recent years, a power tailgate system that can fully automatically open or close a tailgate mounted in an MPV is popular with drivers due to convenience.

A conventional power tailgate control device includes a relay connected between an operation switch and a tailgate control module, and a controller controlling the relay using a signal of a distance measurement sensor provided at the rear of a tailgate vehicle.

With respect to the operation of such a conventional power tailgate control device, when the operation switch receives a tailgate open command from an operator, the distance measurement sensor measures a distance to an obstacle and inputs a corresponding signal to the controller.

The controller receiving the measured signal measures a distance between a body (e.g., a rear bumper) of the vehicle and the obstacle. When the obstacle is within a tailgate opening range, the controller performs a control such that a voltage is not applied to a coil of the relay, thereby preventing a possible collision of the tailgate with the obstacle. When the obstacle is not within a tailgate opening range, the controller performs a control such that a voltage is applied to the coil of the relay, thereby opening the tailgate.

That is, the conventional power tailgate control device has the relay connected between the switch for controlling the opening or closing of the power tailgate and the tailgate control module, and controls the relay on the basis of the distance measured by the distance measurement sensor such as an ultrasonic sensor, thereby preventing the collision of the tailgate with the obstacle.

However, the conventional power tailgate control device needs a separate distance measurement sensor for measuring a distance to an obstacle, which causes an increase in vehicle production costs.

SUMMARY

An aspect of the present invention provides a power tailgate control device and method for preventing a collision with an obstacle during the opening or closing of a tailgate, without requiring a distance measurement sensor.

That is, the power tailgate control device and method may prevent a collision with an obstacle during the opening or closing of the tailgate by determining whether an obstacle is present or not and whether the collision with the obstacle would occur or not by using a rear lamp and a rear camera.

According to an exemplary embodiment of the present invention, a power tailgate control device includes: a command input unit receiving a tailgate open or close command from an operator; a rear camera mounted on a tailgate and capturing an image; and a controller controlling the opening or closing of the tailgate by determining whether a collision with an obstacle would occur or not, on the basis of R (red) values of pixels in a difference image between an image (hereinafter referred to as a "first image") captured in a state in which a rear lamp is turned on and an image (hereinafter referral to as a "second image") captured in a state in which the rear lamp is turned off, during the opening or closing of the tailgate.

According to another exemplary embodiment of the present invention, a power tailgate control method includes: receiving, by a command input unit, a tailgate open or close command from an operator; opening or closing, by a controller, a tailgate according to the receiving of the open or close command; determining, by the controller, whether a collision with an obstacle would occur or not, on the basis of R (red) values of pixels in a difference image between an image (hereinafter referred to as a "first image") captured in a state in which a rear lamp is turned on and an image (hereinafter referred to as a "second image") captured in a state in which the rear lamp is turned off, during the opening or closing of the tailgate; and stopping the opening or closing of the tailgate when it is determined that the collision would occur.

BRIEF DESCRIPTION OF THE DRAWINGS

The above and other objects, features and advantages of the present invention will be more apparent from the following detailed description taken in conjunction with the accompanying drawings:

FIG. 3 is a schematic view illustrating R values of an image captured in a state in which a rear lamp is turned off, according to an exemplary embodiment of the present invention;

FIG. 4 is a schematic view illustrating R values of a difference image, according to an exemplary embodiment of the present invention.

DETAILED DESCRIPTION

Figure 1:
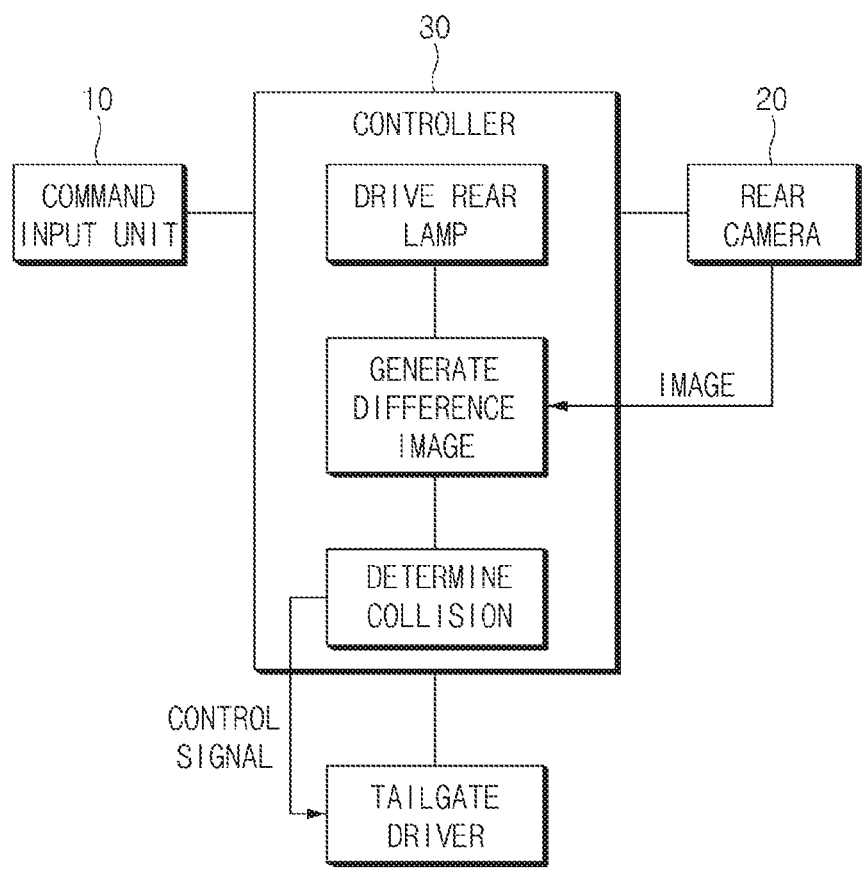
FIG. 1 is a block diagram illustrating the configuration of a power tailgate control device according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The above and other objects, features and advantages of the present invention will be more apparent from the following detailed description taken in conjunction with the accompanying drawings so that those skilled in the art to which the present invention pertains can easily carry out technical ideas described herein. In addition, a detailed description of well-known techniques associated with the present invention will be ruled out in order not to unnecessarily obscure the gist of the present invention. Hereinafter, exemplary embodiments of the present invention will be described in detail with reference to the accompanying drawings.

FIG. 1 is a block diagram illustrating the configuration of a power tailgate control device according to an exemplary embodiment of the present invention.

As illustrated in FIG. 1, the power tailgate control device according to the exemplary embodiment of the present invention includes a command input unit 10, a rear camera 20, and a controller 30.

With respect to each of the aforementioned elements, first, the command input unit 10 may be formed as a button or a switch, and may be disposed around a driver seat of a vehicle and receive a tailgate open or close command from an operator. Alternatively, the command input unit 10 may be provided on a touchscreen of an Audio, Video, Navigation (AVN) system. Here, a touch sensor may sense a touch applied to the touchscreen by using at least one of various touch sensing methods including a resistive type, a capacitive type, an infrared type, an ultrasonic wave type, an electromagnetic type, and the like.

Next, the rear camera 20 may be a wide angle camera. The rear camera 20 may be mounted on the tailgate of the vehicle and capture an image under control of the controller 30.

In general, the tailgate of the vehicle is provided with a rear lamp as well as the rear camera 20. The rear lamp includes a brake lamp and a tail lamp.

The rear lamp preferably uses red light, because red light has a long wavelength. Such long wavelength light lacks linearity, but has large waves such as diffraction, and thus, it has an advantage of being able to be recognized from a distance, but has a disadvantage of illuminating a distant object weakly due to the lack of linearity. Therefore, a headlamp and a backup lamp for illuminating a distant object preferably use a short wavelength light source (a white light lamp) having excellent linearity.

Meanwhile, when illuminating an object farther away than a predetermined distance, long wavelength light does not return after being reflected, due to the lack of linearity. That is, when an operator turns on a brake lamp in a state in which the rear of the vehicle is positioned close to a wall, the operator can recognize red light of the brake lamp reflected from the wall. However, in a state of being separated from the wall by more than a predetermined distance, the operator may not be able to recognize the red light of the brake lamp even when turning the brake lamp on, since the red light of the brake lamp is not reflected from the wall.

In particular, red light lacks the capability of reaching a distant object, but reaches a close object within a predetermined distance (for example, 50 cm). That is, when the brake lamp is turned on or off, there is a difference in images with respect to a close object.

In summary, in a case in which an obstacle is positioned within a predetermined distance from the rear lamp, when an image captured by the rear camera 20 in a state in which the rear lamp is turned on is compared with an image captured by the rear camera 20 in a state in which the rear lamp is turned off, there is a difference in the brightness (R values of pixels) of the obstacle.

According to exemplary embodiments of the present invention, such a difference in brightness may be used to determine whether the obstacle is present or not and whether a collision with the obstacle would occur or not. Here, the obstacle may be any object that may cause a collision when the tailgate is opened or closed.

Then, the controller 30 generally controls the aforementioned respective elements to perform the functions thereof normally.

In particular, when the controller 30 receives a tailgate open or close command from an operator through the command input unit 10, the controller 30 may control a tailgate driver to open or close the tailgate.

During the opening or closing of the tailgate, the controller 30 may control the rear camera 20 to capture an image (hereinafter referral to as a "first image") in a state in which the rear lamp is turned on, and the controller 30 may control the rear camera 20 to capture an image (hereinafter referred to as a "second image") in a state in which the rear lamp is turned off. The controller 30 may perform these operations periodically, until the tailgate is completely opened or closed.

In addition, the controller 30 may perform the matching of the first image and the second image obtained periodically during the above-stated image capturing operation.

That is, the opening or closing speed of the tailgate is very slow relative to the time taken for capturing the first image and the second image. However, unless the first image and the second image are captured in a state in which the opening or closing of the tailgate is stopped, there will be a difference between the first image and the second image.

Thus, the controller 30 may perform the matching of the first image with the second image. Here, unmatched pixels may be removed.

Such an image matching operation may be facilitated through generally well-known auto correlation and normalization.

Thereafter, the controller 30 may generate a difference image between the first image and the second image which are matched to each other. In general, since an image is represented by RGB values, it can be represented by three matrices. According to an exemplary embodiment of the present invention, since the characteristics of red light of the rear lamp are used, R values of pixels are only used to generate a difference image.

Then, the controller 30 may determine whether a collision with an obstacle would occur or not, on the basis of the R values from the difference image. When the controller 30 determines that the collision would occur, it stops the opening or closing of the tailgate, and when the controller 30 determines that the collision does not occur, it does not stop the opening or closing of the tailgate.

That is, when the controller 30 determines that the collision would occur, it transmits a control signal for stopping the opening or closing of the tailgate to the tailgate driver, and when the controller 30 determines that the collision does not occur, it does not transmit the control signal for stopping the opening or closing of the tailgate to the tailgate driver.

Hereinafter, an example of determining whether a collision with an obstacle would occur or not will be described with reference to FIGS. 2 to 4.

Figure 2:
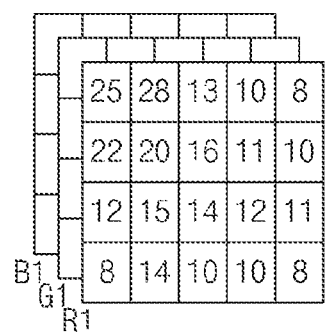
FIG. 2 is a schematic view illustrating R values of an image captured in a state in which a rear lamp is turned on, according to an exemplary embodiment of the present invention.

FIG. 2 is a schematic view illustrating R values of an image captured in a state in which a rear lamp is turned on, according to an exemplary embodiment of the present invention. For better understanding, the image is represented by 5×4 pixels, but is not limited thereto.

FIG. 3 is a schematic view illustrating R values of an image captured in a state in which a rear lamp is turned off, according to an exemplary embodiment of the present invention. For better understanding, the image is represented by 5×4 pixels, but is not limited thereto.

FIG. 4 is a schematic view illustrating R values of a difference image according to an exemplary embodiment of the present invention. The difference image represents a difference between the R values, in FIG. 2, of the image captured in a state in which the rear lamp is turned on and the R values, in FIG. 3, of the image captured in a state in which the rear lamp is turned off. Here, it is assumed that the matching operation between the image captured in the state in which the rear lamp is turned on and the image captured in the state in which the rear lamp is turned off has been completed.

As illustrated in FIG. 4, a portion of the difference image in which an R value is 0 is not affected by the red light of the rear lamp, which indicates that an obstacle is not present, and a portion of the difference image in which an R value is not 0 is affected by the red light of the rear lamp, which indicates that an obstacle is present.

However, considering a case in which an R value of the difference image may not be 0 due to external conditions, the following methods for more clarity may be used:

As a first method, it is determined whether an obstacle is present or not, on the basis of the distribution of R values exceeding a reference value (for example, 7) in the difference image, and it is determined whether a collision with the obstacle would occur or not.

As a second method, when a ratio of the number of R values exceeding a reference value (for example, 7) to a total number of R values in the difference image exceeds a threshold value (for example, 10%), and the controller 30 determines that an obstacle is present and determines that a collision with the obstacle would occur.

In the example illustrated in FIG. 4, there are 4 pixels exceeding the reference value, among a total of twenty pixels, and thus, the ratio is 20%, which exceeds the threshold value of 10%. Therefore, the controller 30 determines that the collision with the obstacle would occur.

Figure 5:
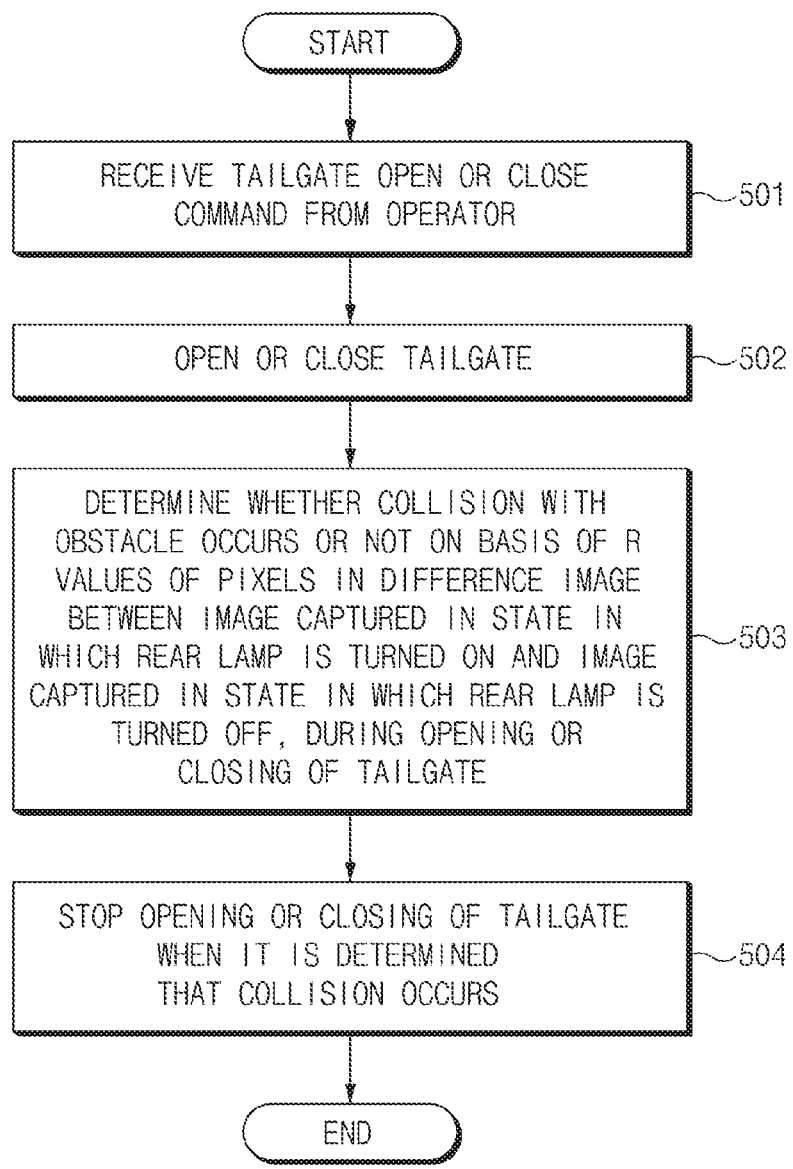
FIG. 5 is a flowchart illustrating a power tailgate control method according to an exemplary embodiment of the present invention.

FIG. 5 is a flowchart illustrating a power tailgate control method according to an exemplary embodiment of the present invention.

First of all, the command input unit 10 may receive a tailgate open or close command from an operator (501).

Next, the controller 30 may open or close a tailgate (502).

During the opening or closing of the tailgate, the controller 30 may determine whether a collision with an obstacle would occur or not, on the basis of R (red) values of pixels in a difference image between an image (hereinafter referred to as a "first image") captured in a state in which a rear lamp is turned on and an image (hereinafter referral to as a "second image") captured in a state in which the rear lamp is turned off (503).

Then, when it is determined that the collision with the obstacle would occur, the controller 30 stops the opening or closing of the tailgate (504).

Meanwhile, the above-stated method according to the exemplary embodiment of the present invention may be written as a computer program. Codes and code segments constituting the program may easily be inferred by a computer programmer skilled in the art. The written program may be stored in a computer-readable recording medium (an information storage medium) and be read and executed by a computer, thereby implementing the method according to the exemplary embodiment of the present invention. The recording medium includes all types of computer-readable recording media.

As set forth above, there is an effect of preventing a collision with an obstacle during the opening or closing of the tailgate without a distance measurement sensor.

In addition, there is also an effect of preventing a collision with an obstacle during the opening or closing of the tailgate by determining whether an obstacle is present or not and whether the collision with the obstacle would occur or not by using a rear lamp and a rear camera.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A power tailgate control device, comprising:
   a command input unit receiving a tailgate open or close command from an operator;
   a rear camera mounted on a tailgate; and
   a controller controlling opening or closing of the tailgate by determining whether a collision with an obstacle would occur or not, on the basis of a difference image between a first image captured by the rear camera in a state in which a rear lamp is turned on and a second image captured by the rear camera in a state in which the rear lamp is turned off, during the opening or closing of the tailgate.

2. The power tailgate control device according to claim 1, wherein the controller determines whether the collision with the obstacle would occur or not, on the basis of R (red) values of pixels in the difference image.

3. The power tailgate control device according to claim 2, wherein the controller determines that the collision with the obstacle would occur, when a ratio of the number of R values exceeding a reference value to a total number of R values in the difference image exceeds a threshold value.

4. The power tailgate control device according to claim 1, wherein the controller controls the rear camera to capture the first image and the second image periodically and determines whether the collision with the obstacle would occur or not, until the tailgate is completely opened or closed.

5. The power tailgate control device according to claim 1, wherein the rear lamp is one of a brake lamp and a tail lamp.

6. The power tailgate control device according to claim 1, wherein the controller matches the first image with the second image.

7. A power tailgate control method, comprising the steps of:
 receiving, by a command input unit, a tailgate open or close command from an operator;
 opening or closing, by a controller, the tailgate according to the receiving of the open or close command;
 determining, by the controller, whether a collision with an obstacle would occur or not, on the basis of a difference image between a first image captured in a state in which a rear lamp is turned on and a second image captured in a state in which the rear lamp is turned off, during the opening or closing of the tailgate; and
 stopping the opening or closing of the tailgate when it is determined that the collision would occur.

8. The power tailgate control method according to claim 7, wherein the determining step is performed on the basis of R (red) values of pixels in the difference image.

9. The power tailgate control method according to claim 8, wherein, in the determining step, it is determined that the collision with the obstacle would occur when a ratio of the number of R values exceeding a reference value to a total number of R values in the difference image exceeds a threshold value.

10. The power tailgate control method according to claim 7, wherein the determining step is performed periodically until the tailgate is completely opened or closed.

11. The power tailgate control method according to claim 7, wherein the rear lamp is one of a brake lamp and a tail lamp.

12. The power tailgate control method according to claim 7, wherein, in the determining step, the first image is matched with the second image before the difference image is generated.

* * * * *